April 15, 1958     P. E. ANDERSON ET AL     2,830,496
CONTACT LATCH MECHANISM
Filed March 26, 1954                         3 Sheets-Sheet 1
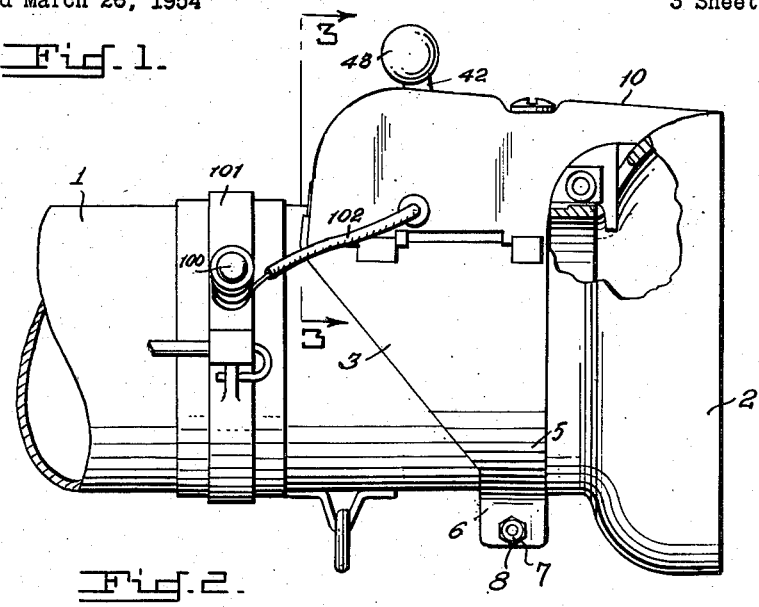
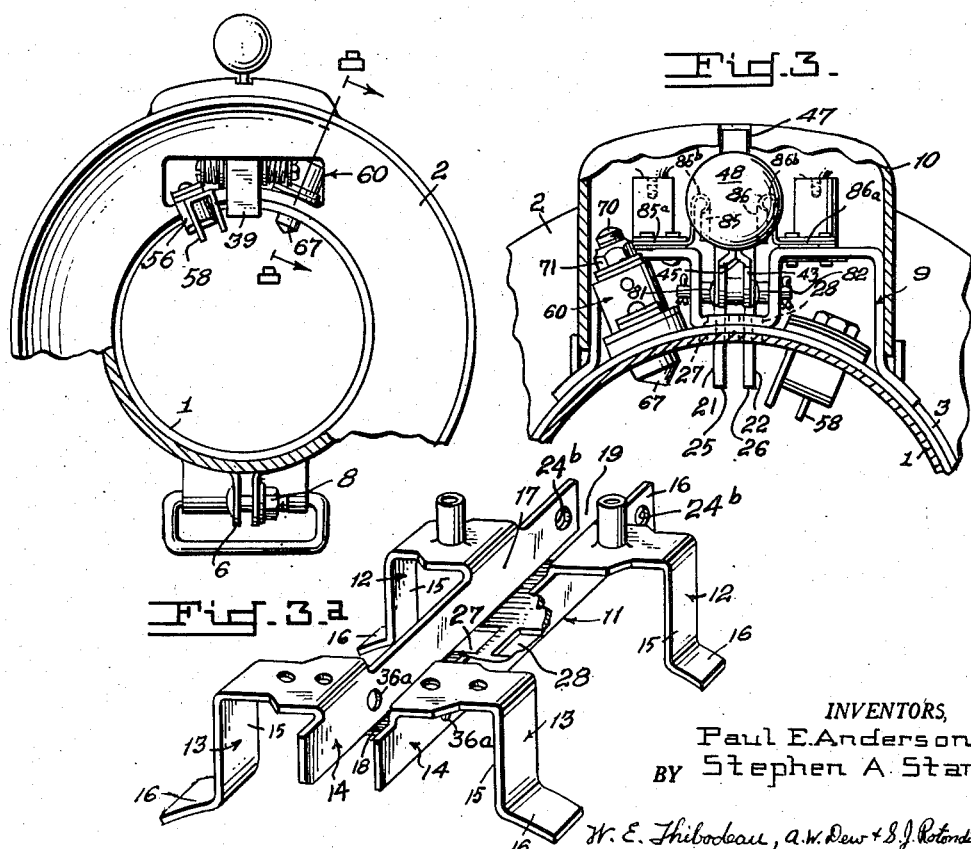
INVENTORS,
Paul E. Anderson
BY Stephen A. Stam
W. E. Thibodeau, A. W. Dew & S. J. Rotondi, Jr.
ATTORNEYS.

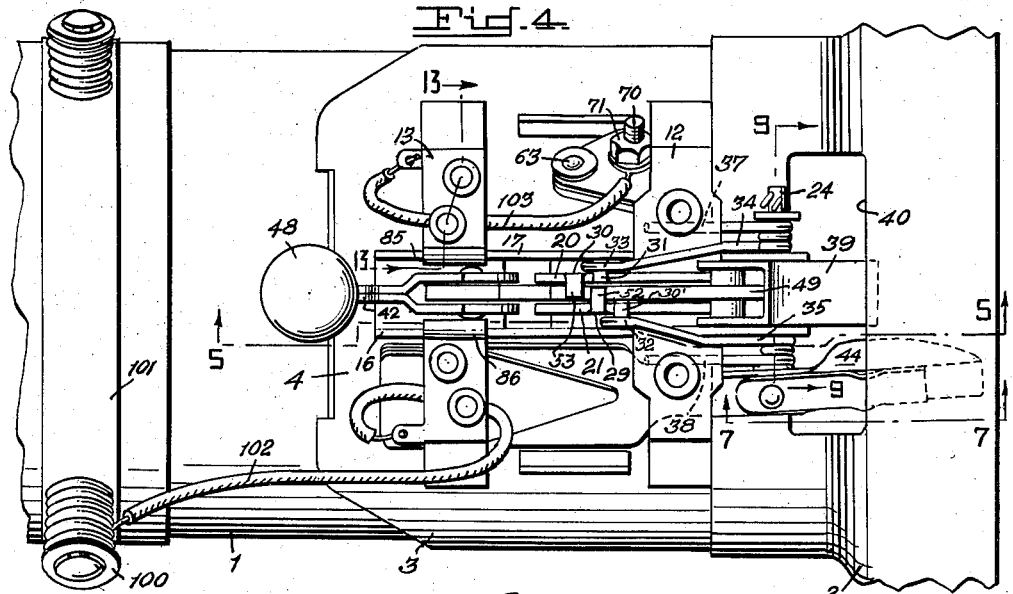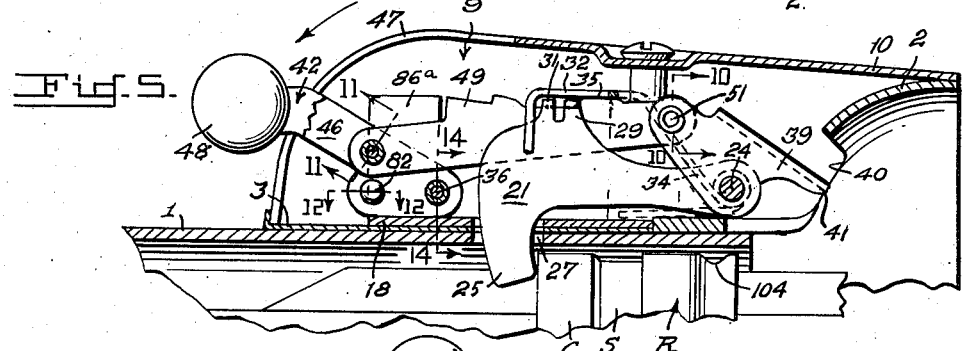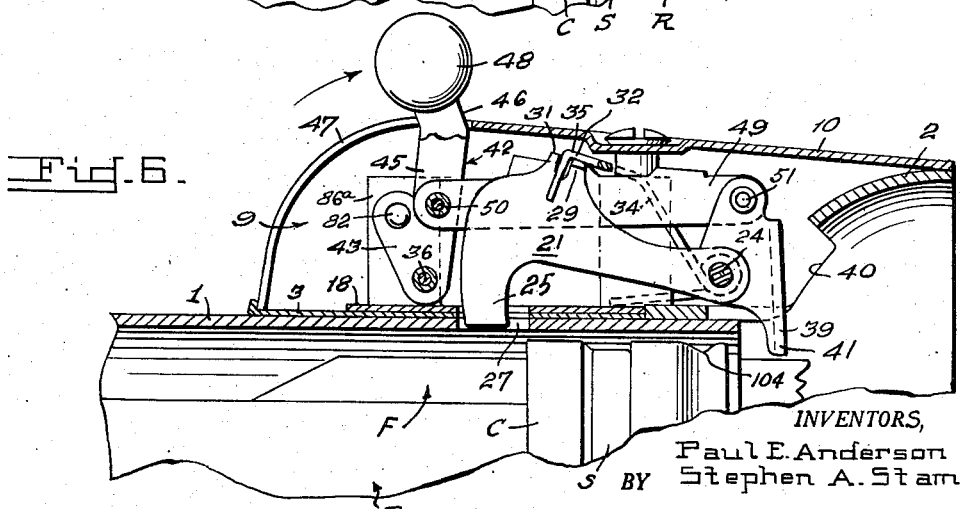

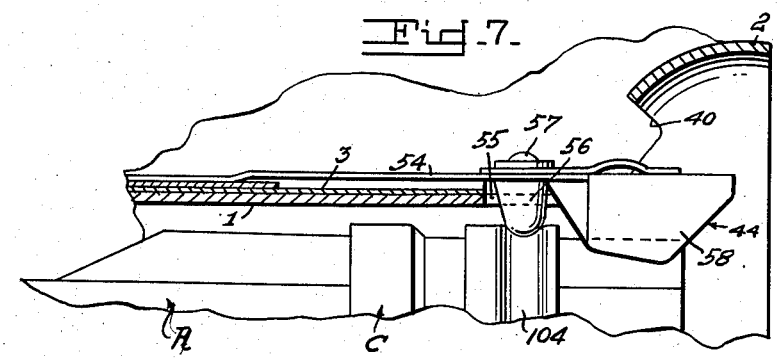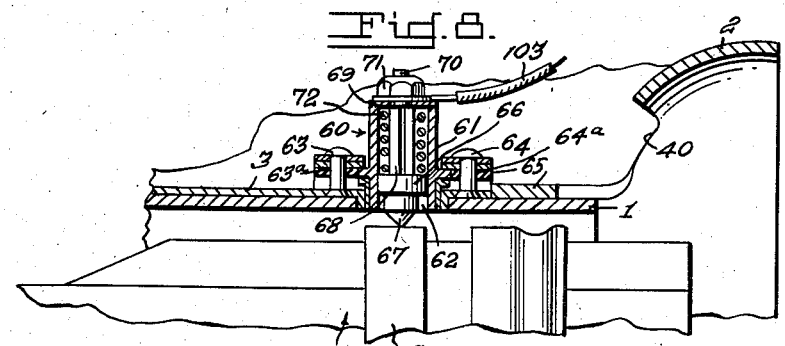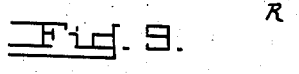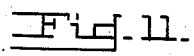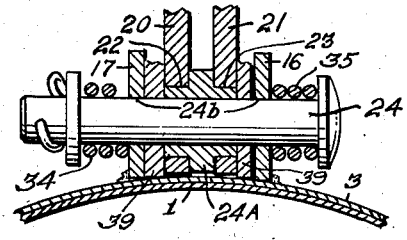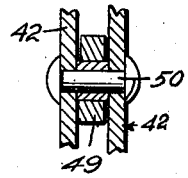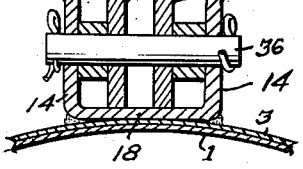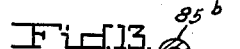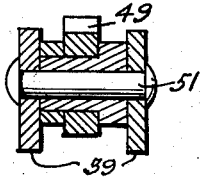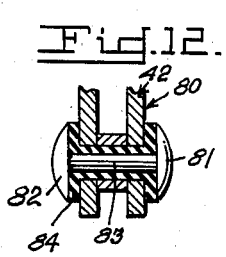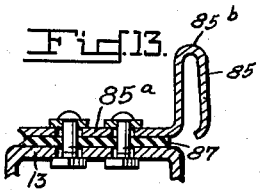

United States Patent Office 2,830,496
Patented Apr. 15, 1958

2,830,496

CONTACT LATCH MECHANISM

Paul E. Anderson, Torrance, and Stephen A. Stam, Glendale, Calif., assignors to the United States of America as represented by the Secretary of the Army Application March 26, 1954, Serial No. 419,120

1 Claim. (Cl. 89—1.7)

This invention relates to a contact latch mechanism for positioning and firing an electrically ignited rocket in a "Bazooka" type rocket launcher.

Rockets of this type usually are provided with an electrically insulated contact band about the fin assembly which is engaged by an insulated contact on the launcher tube when the rocket is in position to be fired. The firing circuit extends from a source of power through the usual trigger mechanism, through switch means which is usually a part of a device for latching the rocket in place in the launcher tube, and thence to a squib embedded in the rocket propelling charge, by way of the aforesaid insulated contact and contact band.

The mechanism for firing the rocket, though manually operable and semi-automatic in action, must always be under the direct and immediate control of the operator, so that necessary precautions may be made to clear the area immediately to the rear of the launcher tube to prevent injury to personnel from "flareback." In order to avoid premature and inadvertent firing, and at the same time maintain the desired speed in loading and positioning a rocket in the launcher tube, and firing the rocket only when the rocket is properly positioned in the tube, the contactor latch mechanism must include guide members for loading, stop members for positioning, and contact members for readying the firing circuit for manual actuation, which depend upon the proper positioning of the rocket within the tube.

To this end it is a primary attainment of this invention to provide a simple contact latch mechanism easily assembled, and facilely adaptable to launcher tubes of varying sizes, effective to properly position a rocket within a launcher tube, and certain in its operation to ready the firing circuit of a rocket in place, for manual actuation.

Another important aim of this invention is to provide a contactor latch mechanism in which an electrical contactor engages a contact band on the rocket, and in which an electrical safety switch is included which practically eliminates premature or inadvertent firing.

A further consideration impelling the conception of this invention is a contactor latch mechanism which includes retractable stop members effective to position the rocket in place in the tube in loading, and a spring detent device to maintain the rocket in proper position after the stop members have been retracted for firing.

It is another important motive to provide a blast operated device as part of the contactor latch mechanism, which is rotated to a position wherein it will intercept—after a slight forward travel of the rocket—a portion of the rearwardly exhausted propellant gases by the operator in moving the operating lever to firing position, the entire mechanism being automatically returned to load position by the action of the propellent gases on the blast vane and by linkage connecting the vane to the operating lever. It is a further object to utilize the projection of the blast vane device into the bore diameter of the launcher to impede inadvertent loading of a rocket into the tube except when mechanism is in the loading position.

A still further object is to provide a contactor latch device which mounts all the beforementioned mechanism in a sound, simple and compact manner such that the complete apparatus can be easily attached to a standard launcher.

Additional objects, advantages and features of the invention reside in the construction, arrangement and combination of parts of the illustrated embodiment of the invention as will appear in the following description and in the accompanying drawings wherein:

Figure 1 is a side elevation, illustrating a latch mechanism, constructed in accordance with the invention, and mounted upon the upper surface of the breech end of a rocket launcher.

Figure 2 is a rear view thereof, parts being broken away for illustrative purposes;

Figure 3 is a sectional view taken along line 3—3 on Figure 1;

Figure 3a is an isometric view of the base bracket.

Figure 4 is a top plan view of the invention with cover removed.

Figure 5 is a longitudinal section taken along line 5—5 on Figure 4 and including the cover, the mechanism including the safety switch being in "safe" or loading position.

Figure 6 is a similar view, the mechanism including the safety switch being in "fire" position.

Figure 7 is a partial section view taken along line 7—7 on Figure 4, illustrating the detent assembly.

Figure 8 is a section view taken along the line 8—8 on Figure 2 illustrating the firing pin assembly.

Figure 9 is a detail section taken along line 9—9 on Figure 4.

Figure 10 is a detail section taken along line 10—10 on Figure 5.

Figure 11 is a detail section taken along line 11—11 on Figure 5.

Figure 12 is a detail section taken along line 12—12 on Figure 5, illustrating the contact points.

Figure 13 is a detail section taken along line 13—13 on Figure 4 illustrating one of the contact springs.

Figure 14 is a detail section taken along line 14—14 on Figure 5.

Referring more particularly to the drawing wherein like reference characters have been used to represent like or corresponding parts in the several views, reference character 1 designates a launcher tube having the conventional bulbous breech guard 2 secured about its breech end to facilitate loading. A mounting clamp 3 encircles the breech end, and is shown as a strap split at its lower end and having a relatively elongated top portion 4 tapering gradually toward its lower shorter end 5 to terminate in downwardly depending flanges or ears 6 transversely apertured at 7 to receive a bolt and nut assembly 8, as clearly seen in Figure 1.

The contact latch assembly designated generally as numeral 9 is received within a cover 10 and is secured to the top surface of clamp 3 by means of a base bracket 11 (Figure 3a) which comprises a first pair 12 of transversely alined inverted U-shaped members mounted on clamp 3, adjacent the breech end of the launcher tube, and a second similarly arranged pair 13 spaced axially forward of the first pair and secured adjacent the forward end of clamp 3. Each pair of U-shaped members 12 and 13, are arranged so that a short leg 14 rests atop the clamp 3, there being a circumferential space between the adjacent legs, and a longer leg 15 having arcuate ends 16 curved to conform to the curvature of the clamp 3 and fastened thereto in any acceptable manner, as by welding or riveting. The short legs 14 are formed integrally with transversely opposed vertical elongated straps 16 and 17, whose lower ends are secured integrally to an arcuate strap 18 curved to rest upon the top surface of clamp 3, the two opposed straps 16 and 17, and curved straps 18 forming a trough 19 to receive the various linking elements of the latch mechanism now to be described.

Referring particularly to Figures 4, 5 and 6 a pair of forwardly directed and transversely spaced flat elongated stop members 20, 21, are disposed in trough 19 with their flat faces in vertical parallelism, each of said stop members being transversely apertured at their rear ends, as at 22, 23, to be pivotally mounted on a lateral spacer and bushing 24a snugly surrounding horizontal transverse pivot pin 24 mounted in transversely aligned bearing holes 24b in the opposed faces of straps 16 and 17 adjacent the breech end of launcher tube 1.

The forward end of each of the stop members is provided with a downwardly depending abutment or finger 25, 26 (see Figure 3) each adapted to move freely within a respective slot 27, 28, extending through both the clamp member 3 and launcher tube 1 to engage a portion of a rocket when in launching position within the tube, as later to be described. Each of the stops is also provided with upwardly extending portions 29, 30, to each of which is integrally secured a laterally inwardly extending teat or protuberance 30', 31, respectively engaged by an extension 32, 33, of stop lever torsion springs 34, 35, wound about pivot pin 24, each spring in turn having its other free end 37, 38, abutting the under surface of a corresponding one of inverted U-shaped members 12 to permanently bias (see Figure 5) stop members 20, 21, counterclockwise downwardly into rocket engaging position.

Again referring to Figures 5 and 6, where Figure 5 represents the latch mechanism in safe or load position, and Figure 6 in firing position, the blast operated vane or link 39 comprises a generally inverted channel shaped elongated member having aligned bearing holes in its depending sides to pivotally mount the same on pivot pin 24 for normal clockwise rotation from safe to firing position through a slot 40 in the bulbous breech guard 2 such that a downwardly depending tapering portion or vane 41 extends over the breech end of launcher tube 1 and into the path of exhaust gases only when the parts are in the position depicted in Fig. 6. The mechanism for optionally moving the blast vane in and out of safe and firing position comprises a generally V-shaped control lever 42 pivotally mounted at its apex portion upon a pivot pin 36 mounted in aligned bearing holes 36a, Fig. 3a, in straps 16, 17, adjacent the forward end, such that in normal or safe position the left leg 43 of the V rests (as seen in Figure 5) upon web portion 18 of trough 19. The other leg 45 of the V is elongated to provide an extension 46 feely movable through an elongated slot 47 in the cover 10 between the limiting positions shown upon Figs. 5 and 6, there being an operating knob or handle 48 secured to its free end, which in addition, gives a visual indication to enable the crew to determine if the launcher is in load or safe position, or ready to fire. A connecting link 49 is pivotally secured at its forward end by a pivot pin 50 in leg 45 of the control lever 42, and at its rear end to the upper end of blast vane 39 by means of a pivot pin 51. The connecting link is arranged so as to be freely movable between the inner opposed faces of stop levers 20, 21, which in turn are provided with lateral inwardly directed protuberances or fingers 52, 53, which ride upon the upper edge of link 49, as a result of which the stop levers are lifted out of engagement with a rocket when the operating lever 42 is moved from load to firing position, in a manner to be later described.

The before-mentioned detent member 44, clearly illustrated in Figure 7, comprises a substantially flat elongated resilient member 54 lying flat upon and secured at its forward end to clamp 3 to extend rearwardly toward the breech end thereof and into slot 40 in the bulbous breech guard 2. Forwardly of the breech end, launcher tube 1 and clamp 3 are provided with a hole 55 into which protrudes a downwardly depending detent finger or lug 56 secured at 57, as by riveting to resilient member 54. Fixed to the rear end of member 54 is a channel shaped tab member 58 normally extending over the breech end of the launcher tube 1. As clearly seen in Figure 2, the tab member 58 is circumferentially spaced to lie on one side of blast vane 39 and extends radially toward the longitudinal axis of launcher tube 1, whereas a later to be described firing contact member 60 likewise assumes a similar position on the other side of the blast vane.

The firing contact member 60 is illustrated in Figure 8 and comprises a vertically upstanding cylindrical sleeve 61 adapted to snugly and peripherally engage the circumference of a hole 62 extending through clamp 3 and launcher tube 1. Sleeve 61 is in turn secured to clamp 3 as by rivets 63 and 64 extending through holes 63a and 64a formed in a plate 65 integral with sleeve 61. Vertically reciprocable within sleeve 61 is a piston like plunger 66 slidably engaging the inner wall of sleeve 61, and provided with a lower pointed end 67 adapted to engage the contact band C of a rocket, and an upwardly elongated reduced portion 68 extending above the upper inwardly flanged end 69 of sleeve 61, and having its upper end threaded at 70 to receive a nut 71. A helical spring 72 surrounds reduced portion 68 to permanently bias point 67 into contact band engaging position.

An important element of the invention is a saftey switch 80 operates by the movement of the control lever 42, and comprising a pair of contact points 81, 82 (see Figures 12 and 3) insulatingly carried by control lever 42, so that each contact point is a spheroidal button protruding from its corresponding surface of lever 42 and connected to each other by pin 83 extending through lever 42. Dielectric material 84 insulates contact points 81, 82, and connecting pin 83 from lever 42. As the control lever is moved contact buttons 81, 82, in turn engage contact leaf springs 85, 86, one of which is illustrated in Figure 13 and comprise flat portions 85a, 86a, and upwardly extending inverted U-portions 85b, 86b. The flat portions are secured to the respective upper surfaces of members 13 of bracket 11 so that the U-portions 85b, 86b, are transversely aligned and separated by a distance a little less than the separation of buttons 81 and 82 so that 85 and 86 are electrically connected when control lever 42 is in the position shown upon Fig. 6. Dielectric material 87 separates the leaf springs from the remaining launcher structure.

The firing circuit for the rocket extends from a source of power (not shown) through the usual trigger actuated switch means (not shown) and then by a lead to a spring terminal 100 (see Figure 4) mounted on an insulated band 101 secured about the launcher tube, thence by lead 102 to leaf spring 86. Leaf spring 85 in turn is connected by a lead 103 to the top end 70 of contact plunger 66 by means of nut 71. The rocket R (see Figure 6) is provided with the usual fin assembly F surrounded by shroud S, the forward end of which is formed as the insulated contact band C. The shroud is provided with a detent groove 104 adjacent its rear end to be engaged by the detent finger 56 when the rocket is in place. See Fig. 7. Contact band C is connected by a lead (not shown) to the firing of the rocket propelling charge (not shown), the usual grounded connections for the squib also being provided.

The operation of the latch mechanism is as follows:

Prior to the loading of a rocket in the launcher tube the control lever 42 is placed in the "load" position (see Figure 5) i. e. down. In this position the connecting link 49 is free of the fingers 52, 53, on stop levers 20, 21, as a result of which the stop levers are forced downwardly by springs 34 and 35 to extend into the launcher tube. As previously explained when the operating lever is in the "load" position the blast vane 39 is also rotated clear of the launcher tube bore. The launcher tube is now ready to be loaded. As the rocket R is forced into the launcher tube, tab 58 rides on the surface of the projectile and forces the detent finger 56 out of engagement with the rocket until the shroud assembly proceeds beyond the forward end of the tab. The rocket will then come to a stop when the stop levers 20, 21, engage the shroud S adjacent the forward end of contact band C, and at the same time the detent lug 56 will be forced downwardly by resilient member 54 and into detent groove 104. In this position of the rocket, the point of contact plunger 66 engages the contact band C; the detent lug and groove arrangement is designed to restrain the rocket from displacement against a force of 20 lbs; however the rocket cannot be fired even if all other circuit connections have been made, due to the action of safety switch 80. Also, a visual indication of the "load" condition of the launcher is given by the position of the control handle 48 as previously stated.

To place the launcher in firing position the control handle is now raised until the contact points 81, 82, are in engagement with the contact springs 85, 86, thus completing the electrical circuit between the trigger and the rocket. The movement of the control handle 48 to firing position simultaneously pivots blast vane 39 into position to intercept a portion of the exhaust gases, and also raises stop levers 20, 21, until they are free of the rocket by virtue of the engagement of the top surface of connecting link 49 with fingers 52, 53. When the operator presses the trigger the propellent charge is initiated to launch the rocket and after a short forward travel of the rocket, a portion of the exhaust gases impinge against the blast vane to move it and the control handle, and the entire latch mechanism back to "load" position.

It is apparent that the above description discloses a novel and improved rocket launcher latching mechanism including an ingenious arrangement of a pair of stop levers permitting the rocket to be inserted into the launching tube in any position of rotation about the longitudinal axis, without the tail fins holding both stop levers up unitl they miss the shroud ring. The levers are so spaced that a single fin cannot touch both levers at the same time, but are yet close enough together that two tail fins cannot engage both levers at the same time. Due to the unique contour of the stop levers, they will ride over the nose of the rocket, yet securely engage the shroud ring of the rocket.

Further advantages are obtained by the simple four bar linkage that is used to lift the stop levers, and the blast vane force to reset the mechanism. Greater simplicity has been obtained by use of the spring loaded contact firing pin.

The detent assembly is so constructed that a rocket cannot be inadvertently fired by a reverse circuit (i. e., the detent in the contact band the firing contact plunger against a fin) during loading. The large double tab on the aft end of the member 54 causes the detent plunger 38 to ride clear of the contact band.

Finally, the switch parts are a rigid part of the operating lever assembly, consequently the position of the operating lever clearly indicates the switch position. The contact points are selfclearing due to their wiping action on the spring members.

Safety is further assured through dual use of blast vane as an actuating member and safety stop to prevent loading round into tube when mechanism is in "fire" position.

While a preferred form of the invention has been shown and described, various modifications and substitutions of equivalents will occur to those skilled in the art after a study of the foregoing disclosure. Hence, the disclosure should be taken in an illustrative rather than a limiting sense, and it is the desire and intention to reserve all modifications within the subjoined claim:

In a contact and stop mechanism for a rocket launcher tube, the combination with, a clamp for the securement of said mechanism on the breech end of said launcher comprising, a clamp for encircling said tube, said clamp defining an elongated arcuate upper portion tapering towards its lower ends thereof to terminate in downwardly depending ears adapted to receive adjustable fastening means; means for supporting operating elements of said mechanism on said clamp comprising, a unitary base bracket defining forward and reaward pairs of axially spaced, transversely aligned, inverted U-shaped members, each said member defining a short leg resting on the upper portion of said clamp and a longer leg having an arcuate end secured to said upper portion, said short legs being integral with transversely opposed elongated vertical straps, their lower ends thereof being integrally connected to an arcuate web resting on said upper portion and forming a mechanism receiving trough; said contact and stop mechanism comprising, first and second pivot pins mounted by and between said vertical straps at the forward and rearward ends thereof, a control lever journaled on said first pivot pin between said straps for pivotal movement from a first forward loading position to a second vertical firing position, a pair of identical stop members journaled in laterally spaced relation for independent rotation on said second pin, each said stop member defining a downwardly depending finger and an upwardly extending portion having an integral inwardly extending protuberance, a blast vane pivoted on said second pivot pin for pivotal movement from a first position free of the blast path of a rocket in said tube to a second position within said path for operation by said blast to return to said first position, a link disposed between said stop members having its forward end pivotally connected to said control lever and at its rearward end to the upper end of said blast vane, said link having an effective length approximately equal to the separation of said pivot pins, said protuberances on said stop levers overlapping and resting on the upper edge of said link, whereby said stop members and said blast vane are positively moved to their said second position by and in response to pivoting of said control lever to said second position, a pair of torsion springs, each said spring being anchored at its rearward end to said second pivot pin and the forward end thereof biasing a respective stop member in a counterclockwise direction into rocket engaging position; a firing circuit for firing a rocket in said tube and including first and second laterally spaced electrical terminals each carried by a respective strap, a single contact fixed with said control lever and insulated therefrom for movement to bridge said terminals when said lever is in second position only, and a resilient latch carried by said bracket to yieldably engage a peripheral groove in a rocket when the latter is stopped in loading movement by said stop members in first position; and protective means for said contact and latch mechanism comprising a detachable cover for enclosing said mechanism having an elongated slot disposed medially in the rearward and upper having a length equal to the travel of rotation of said lever.

References Cited in the file of this patent

UNITED STATES PATENTS

| | | |
|---|---|---|
| 2,440,723 | Macdonald | May 4, 1948 |
| 2,451,522 | Uhl et al. | Oct. 19, 1948 |
| 2,465,402 | Skinner et al. | Mar. 29, 1949 |
| 2,496,316 | Skinner et al. | Feb. 7, 1950 |
| 2,557,151 | Skinner et al. | June 19, 1951 |
| 2,685,232 | Brandt | Aug. 3, 1954 |
| 2,751,818 | Bonnett | June 26, 1956 |
| 2,764,066 | Doak et al. | Sept. 25, 1956 |